(12) United States Patent
Voit et al.

(10) Patent No.: US 9,100,346 B2
(45) Date of Patent: Aug. 4, 2015

(54) COMMMON AGENT FRAMEWORK FOR NETWORK DEVICES

(71) Applicant: CISCO TECHNOLOGY, INC., San Jose, CA (US)

(72) Inventors: Eric A. Voit, San Jose, CA (US); Richard M. Pruss, San Jose, CA (US); John E. McDowall, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 13/843,715

(22) Filed: Mar. 15, 2013

(65) Prior Publication Data
US 2014/0269762 A1 Sep. 18, 2014

(51) Int. Cl.
| | |
|---|---|
| H04J 3/16 | (2006.01) |
| H04L 12/28 | (2006.01) |
| H04L 12/781 | (2013.01) |
| H04L 12/931 | (2013.01) |
| H04L 29/06 | (2006.01) |
| H04L 12/24 | (2006.01) |
| H04L 12/26 | (2006.01) |
| H04L 29/08 | (2006.01) |

(52) U.S. Cl.
CPC ............ *H04L 45/52* (2013.01); *H04L 41/0816* (2013.01); *H04L 43/028* (2013.01); *H04L 49/602* (2013.01); *H04L 67/34* (2013.01); *H04L 69/08* (2013.01); *H04L 69/18* (2013.01)

(58) Field of Classification Search
USPC .......................................................... 370/466
See application file for complete search history.

(56) References Cited

U.S. PATENT DOCUMENTS

| | | | |
|---|---|---|---|
| 7,072,356 B1 * | 7/2006 | Clancy et al. .................. | 370/465 |
| 7,187,694 B1 * | 3/2007 | Liao ............................... | 370/474 |
| 7,715,324 B1 * | 5/2010 | Harvell et al. ................. | 370/252 |
| 8,711,838 B1 * | 4/2014 | Guichard et al. ............. | 370/351 |
| 8,811,401 B2 * | 8/2014 | Stroud et al. .................. | 370/392 |

(Continued)

OTHER PUBLICATIONS

Gerhard Munz et al: "Distributed Network Analysis Using TOPAS and Wireshark", Network Operation and Management Symposium Workshops, 2008. NOMS Workshops 2008. IEEE, IEEE, Piscataway, NJ, USA, Apr. 7, 2008, pp. 161-164.
Sundar Iyer et al: "ClassiPI: An Architecture for Fast and Flexible Packet Classification", IEEE Network, IEEE Service Center, New York, NY, US, vol. 15, No. 2, Mar. 1, 2001, pp. 33-41.

(Continued)

*Primary Examiner* — Gerald Smarth
(74) *Attorney, Agent, or Firm* — Patterson & Sheridan, LLP

(57) ABSTRACT

Techniques are provided for automating a common framework for network devices. In one example, a network device (e.g., switch, router, etc.) is configured to resolve the handling unknown packets automatically. The network device can detect whether or not a protocol is unknown to the network device, perform a lookup, determine if a matching protocol is available for the network device, and dynamically load an appropriate protocol handler into a memory of the network device. Advantageously, the present technology provides a mechanism for flexible on-demand push of protocol information. If a new protocol is noted on the network, the network device can look up the type of packet and can use a single platform kit to dynamically load drivers and control logic for that protocol onto the network device. Likewise, other network devices in the packet's path or in the network generally can load the drivers and control logic, as needed.

19 Claims, 5 Drawing Sheets

(56) References Cited

U.S. PATENT DOCUMENTS

| | | |
|---|---|---|
| 2007/0067469 A1* | 3/2007 | Luik et al. .................... 709/230 |
| 2008/0022382 A1* | 1/2008 | Bradbury ........................ 726/10 |
| 2008/0080550 A1 | 4/2008 | Malik |
| 2013/0212265 A1* | 8/2013 | Rubio Vidales et al. ...... 709/224 |
| 2013/0343207 A1* | 12/2013 | Cook et al. .................... 370/252 |

OTHER PUBLICATIONS

Anonymous: "Switch statement—Wikipedia, the free encyclopedia", Feb. 27, 2013.

International Search Report and Written Opinion for PCT/US2014/022336, Jun. 20, 2014.

* cited by examiner

COMMMON AGENT FRAMEWORK FOR NETWORK DEVICES

TECHNICAL FIELD

Embodiments presented in this disclosure generally relate to computer networking and, more particularly, to techniques for providing a common framework for network devices (e.g., switches, routers, etc.) to share protocols for handling data packets and/or data frames.

BACKGROUND

Change is constant in information technology. Computer networks and, in particular, network administration must adapt at the same pace. Whether network administration involves providing deep information for network analytics, simplifying operational tasks, or providing a platform for new services, networks need to be innovation-ready.

Networking hardware or networking equipment typically refers to devices which provide and manage a computer network. Typically, such devices include gateways, routers, network bridges, switches, hubs, and repeaters, among other devices.

A network switch is a computer networking device that links network segments or network devices. The term commonly refers to a multi-port network bridge that processes and routes data at the data link layer (layer 2) of the Open Systems Interconnection (OSI) model. Switches that additionally process data at the network layer (layer 3) and above are often called layer-3 switches or multilayer switches. Switches are available various network protocols or technology including Fibre Channel, Asynchronous Transfer Mode, InfiniBand, Ethernet and others.

One inefficiency of network administration is that a network device (e.g., router or switch) is purchased hard coded with protocols. The only way to add new support is to install a complete new software image onto the device. In a conventional system, enabling protocol discovery and classification only works for supported interfaces, flows, and protocols. A network administrator manually interprets the results, for example, to identify unknown protocols used by devices attached to the network and put in place the policies associated with those protocols, allowing the networking infrastructure to process traffic sent by the attached devices. Based on an administrator evaluation of the protocol discovery results, the network administrator can, for example, load and assign a supported protocol pack. The network administrator can also identify flows that should have custom rules. For example, the network administrator can define a traffic class and policy and manually associate the traffic class and policy. Such a scheme not only limits what can be monitored, but each step of the process flow requires administrator evaluation, identification, and implementation of flows, rules, and policies.

Further, "asymmetric" protocols (e.g., protocols that are routed to different endpoints via load balancing, or protocols that use different upstream and downstream paths) are not effectively monitor-able and controllable on a switch level or a multi-switch level.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

An approach is provided for automating a common framework for network devices of a data center. One embodiment includes a method that automates handling of data packets/frames on a network device. The method includes receiving a packet, detecting for the packet a protocol that is unknown to an input interface of the network device, performing a lookup of the protocol that is unknown in order to find a matching protocol handler for the packet, determining if a matching protocol is available for the network device, and dynamically loading an appropriate protocol handler into a memory of the network device. For the sake of simplicity, in this description, the term "packet" refers to data packets and/or data frames. By convention, a frame typically refers to Layer 2 data and includes both a header and a trailer, whereas a packet typically refers to Layer 3 data and does not include a trailer.

Additional embodiments include without limitation a computer-readable storage medium, storing a program configured to perform the aforementioned method, and a system having a processor and a memory storing a program configured to perform the aforementioned method.

DESCRIPTION OF EXAMPLE EMBODIMENTS

Embodiments presented herein provide techniques for a common framework for network devices (e.g., switches, routers, etc.) share protocols for handling data packets and/or data frames. Typically, protocol discovery on a network device is limited. The present approach provides for network devices configured to identify an unknown protocol flow on the network and, in response, dynamically load a protocol handler to the network device.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purposes of clarity, features relating to technical material that is known in the technical fields related to the proposed ideas have not been described in detail.

Data Center Overview

Figure 1:
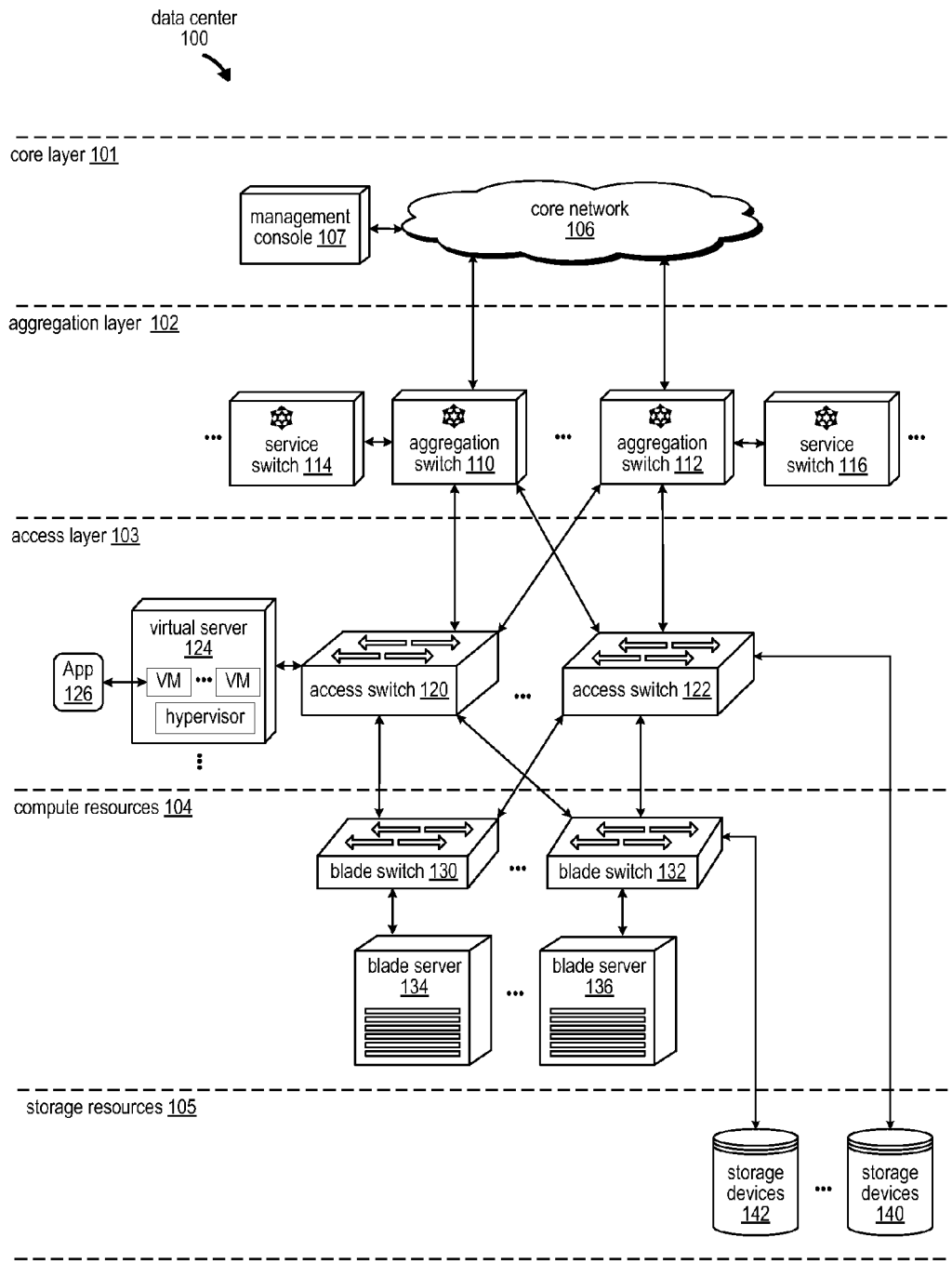
FIG. 1 is a diagram of an example data center, according to certain embodiments of the present disclosure.

FIG. 1 is a diagram of an example data center 100, according to certain embodiments of the present disclosure. The data center 100 includes a network based upon a multi-layer hierarchical network model. In general, such a model implements three layers of hierarchy: a core layer 101, an aggregation layer 102, and an access layer 103. Benefits of such a hierarchical model include scalability, resilience, performance, maintainability, and manageability. The hierarchical design represents a structured approach to building the infrastructure, allowing for relatively easy expansion in modular increments. Redundant nodes (network devices) and links (e.g., connections between network devices) at each level ensure substantially no single point of failure, while link aggregation (e.g., combination of connections between network devices) can be engineered for optimal bandwidth and performance through the aggregation and core layers. Devices within each layer perform the same functions; this consistency simplifies troubleshooting and configuration.

In context of this discussion, a "device" generally includes hardware or a combination of hardware and software. A "component" is typically a part of a device and includes hardware or a combination of hardware and software.

The core layer 101 includes a core network 106 coupled to a management console 107, which enables a network administrator to manage the data center 100. The core layer 101 includes a fabric of network devices (e.g., routers and/or switches) for high-speed packet switching between multiple aggregation modules of the aggregation layer 102. The core layer 101 serves as a gateway to connect other modules, including, for example, an extranet, a wide area network (WAN), and/or an Internet edge, among other modules. Links connecting the data center core layer 101 are terminated at Layer 3 and typically use, for example, 10 GigE interfaces for supporting a high level of throughput, performance, and to meet oversubscription levels. The core layer 101 has a high degree of redundancy and bandwidth capacity and, thus, is optimized for availability and performance. The core network 106 can connect multiple aggregation layers 102 and multiple access layers 103.

The aggregation layer 102 includes network devices, such as aggregation switches (110, 112) that are coupled to service switches (114, 116) in this example. An aggregation switch (110, 112) includes a switch that enables a high degree of high-bandwidth port density capacity. Accordingly, the aggregation layer 102 is optimized for traffic distribution and link fan-out capabilities to the switches of the access layer 103. Functionally, nodes (e.g., network devices) in the aggregation layer typically serve as the Layer 2/Layer 3 boundary. Layer 2 is a data link layer of the Open Systems Interconnection (OSI) model that transfers data between network devices attached to the network and to detect and possibly correct errors that may occur in the physical layer (Layer 1). Layer 3 is a network layer of the OSI model that transfers variable length data sequences from a source host on one network to a destination host on a different network (in contrast to the data link layer which connects hosts within a common network segment), while maintaining the quality of service requested by the transport layer.

A service switch (114, 116) provides flexibility on how network services are defined and carried out on traffic within the data center 100. Examples of network services include without limitation security, firewalls, and subscriber management, among other services.

The access layer 103 includes network devices, such as access switches (120, 122) that are couple to virtual servers 124, in this example. The access layer 103 connects hosts (e.g., client devices) to the infrastructure, providing such hosts with network access, typically at Layer 2 (e.g., local area networks (LANs) and/or virtual local area networks (VLANs)). A virtual server 124 may include a hypervisor coupled to one or more virtual machines. The hypervisor is hardware, or a combination of hardware and software, that generates and runs the virtual machines. A virtual machine (VM) is a software implementation of a machine (e.g., a computer) that executes programs (e.g., a loaded application 126) like a physical machine. Virtual machines generally emulate the computer architecture and functions of a real world computer. One physical host computer and one hypervisor can run multiple virtual machines.

The data center 100 incorporates software defined networking (SDN), which is an approach to building a computer network that involves separating and abstracting elements of the network. The elements include the control plane and the data plane. SDN decouples the system that makes decisions about where traffic is sent (the control plane) from the underlying system that forwards traffic to the selected destination (the data plane). This technology simplifies networking and enables new applications, such as network virtualization in which the control plane is separated from the data plane and is implemented in a software application (e.g., a virtual machine of the virtual server 124). The architecture of the data center 200 architecture enables a network administrator to have programmable central control of network traffic without requiring physical access to the network's hardware devices.

Network devices of the access layer 103 are couple to compute resources 104 and/or storage resources 105, and provide access thereto. The compute resources 104 include one or more blade servers (134, 136) that are coupled to blade switches in this example. A blade server is a server computer with a modular design optimized to minimize the use of physical space and energy. The storage resources include one or more storage devices (140, 142) that are coupled to blade switches and access switches in this example.

Figure 2:
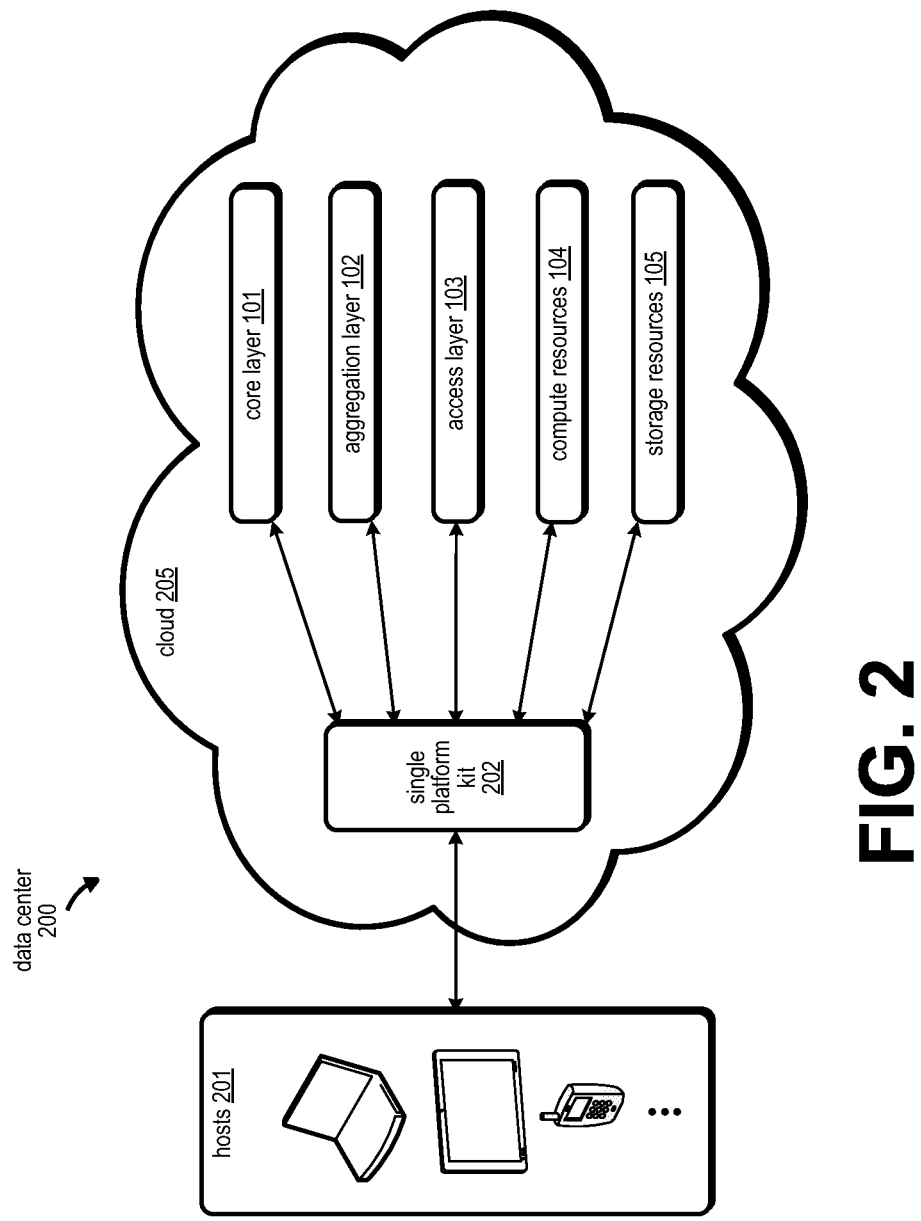
FIG. 2 is a conceptual diagram of a data center that incorporates a single platform kit, according to certain embodiments of the present disclosure.

FIG. 2 is a conceptual diagram of a data center 200 that incorporates a single platform kit 202, according to certain embodiments. The data center 200 includes the network devices of the data center 100 of FIG. 1, including the network devices of the core layer 101, the aggregation layer 102, the access layer 103, the compute resources 104, and the storage resources 105. As shown in FIG. 2, hosts (e.g., client devices and server devices) may communicate with the data center 200 by using the single platform kit 202, which configures the data center 200 under a common framework (e.g., single framework). A common framework enables network devices (e.g., routers and/or switches) to share protocols for handling data packets. Such sharing is particular useful, for example, where one network device cannot handle a particular packet but another network device can. The network devices can share protocols so that the network device that was previously unable to handle the packet can handle the packet due to the sharing. This example of FIG. 2 shows the data center 200 operating as a network cloud 205. Cloud computing on the cloud 205 includes the use of computing resources (hardware and software) that are delivered as a service over a network (typically the Internet) to the hosts 201. Cloud computing entrusts remote services with a user's data, software, and computation.

Conventional networks are typically provisioned, monitored, and maintained by a large toolkit of protocols and techniques, from command-line interface (CLI) to Extensible Markup Language (XML), Simple Network Management Protocol (SNMP) to syslog. While powerful and effective, these tools are limited. For example, these tools tend to provide a fixed set of functionality. While this generally works for whatever fixed purpose a tool is used, the fixed set of functionality does not allow data center operators to customize network devices to meet specific network requirements of the operator. Accordingly, embodiments presented herein facilitate customization of network infrastructures by providing a common framework for network devices. The common framework enables network devices of the system to share protocols for handling data packets. So, a network device that is added and/or customized on the network does not have to be rigidly restricted to the fixed set of functionality of the particular network device. In addition, while the network may consistently and reliably deliver vast steams of data every second, few tools exist to build custom applications which analyze packets and flows in real-time.

In one embodiment, the single platform kit 202 includes a toolkit that enables development, automation, and rapid service generation. For example, the common framework allows developers to compose applications to be run on the network, because a programmer can be assured network devices share a common framework. For instance, the common framework includes a tool (e.g., software application) for a network that can observe network flows that one or more network devices do not recognize. In the aggregate, the tools for the networks devices automate widespread recognition and sharing of protocols, and thereby provide a rapid service for protocol recognition. The single platform kit 202 enables the extension and configuration of the capabilities available on the network devices (e.g., switches, routers, etc.) of the data center 200. The single platform kit 202 enables easier access to the data inside the data center 200 and enables administrators to control the functionality of the data center 200.

Thus, the single platform kit 200 provides a common framework for network devices (e.g., switches, routers, etc.). The common framework includes a system for equipping the network devices of the single platform kit 200 with network based software that is unavailable on conventional network devices. Such software applications may identify an unknown protocol and load a protocol handler to a network device in response to one or more new protocols being used on the network (e.g., data center 200).

Architecture of a Network Device

Figure 3:
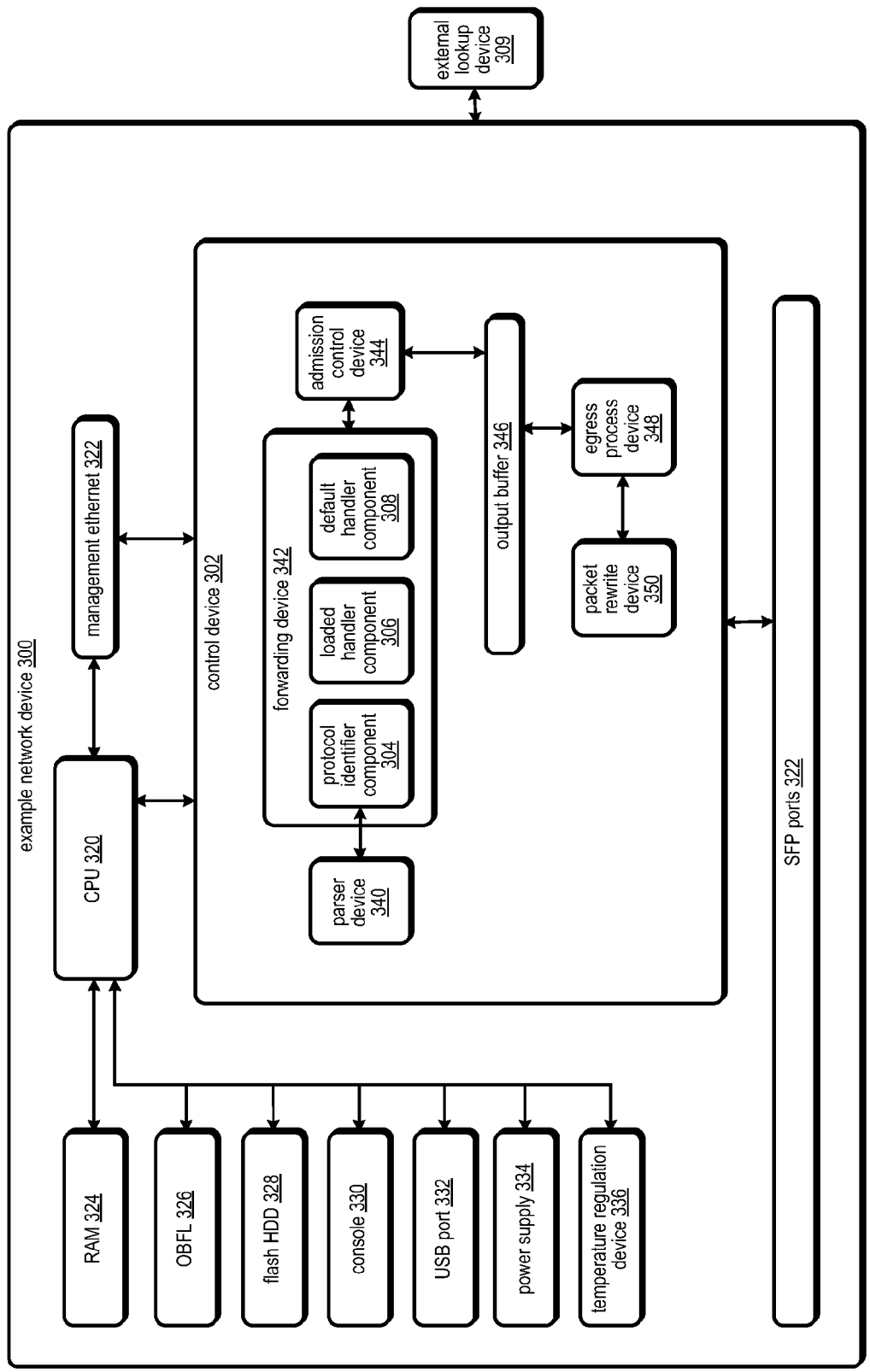
FIG. 3 is a diagram of architecture of an example network device, according to certain embodiments of the present disclosure.

FIG. 3 illustrates an architecture of an example network device 300, according to one embodiment. Illustratively, the network device 300 includes a control device 302 coupled to a central processing unit (CPU) 320, management Ethernet 322, and small form-factor pluggable (SFP) ports 322 (e.g., Ethernet ports). The CPU 320 is coupled to random access memory (RAM) 324, onboard failure logging (OBFL) 326, flash hard disk drive (HDD) 328, a console 330, a USB port 332, a power supply 334, and a temperature regulation device 336. The components of the network device 300 are provided for explanatory purposes. A person skilled in the art can configure the network device 300 in many other ways.

The control device 302 includes a parser 340, a forwarding device 342, an admission control device 344, an output buffer 346, an egress process device, and a packet rewrite device 350. The forwarding device includes a protocol identifier component 304, a loaded handler component 306, and a default handler component 308, which are discussed below with reference to FIGS. 4 and 5. In some embodiments, the control device 302 is an application specific integrated circuit (ASIC). The control device 302 is responsible for many of the switch features, such as VLAN assignment, Layer 2 table lookups, Layer 3 table lookups, buffer allocation, and time stamping. In particular, for layer 2 traffic the control device 302 is responsible for the packet-forwarding decisions.

The parser device 340 parses incoming packets, extracts fields (e.g., headers, trailers, etc.) required to determine whether a given packet should be forwarded. A packet is a basic unit of communication over a digital network. A packet may also be called a datagram, a segment, a block, a cell or a frame, depending on the protocol. When data is transmitted, a network device breaks down the data into similar data structures (packets). A destination computer reassembles the original data chunk once the packets reach a destination. Packets may lost somewhere along the transmission are handled by higher layer protocols (e.g., TCP). The packet header typically identifies a protocol specifies how the network device 300 should handle the packet. The protocol may be in a header of a packet. The parser device 340 then passes the parsed information to Layer 2 and/or Layer 3 lookup devices.

Next, the control device 302 sends the packet to the forwarding device 342 for a learning phase. One function of the forwarding device 342 is to acquire a protocol defining how network device 300 is should process packets. This learning process enables network devices of the data center to operate within a common agent framework by enabling network devices to share protocols for handling data packets and/or data frames. Operations for learning the protocol of the packet are discussed below with reference to FIGS. 4 and 5.

In some implementations, the forwarding device 342 also learns the source Media Access Control (MAC) address in the hardware for the given virtual local area network (VLAN). Then, depending on the destination MAC address lookup result, the control device 302 forwards the packet to an external lookup device 309 (e.g., a Layer 3 processing device), the CPU 320, and/or all network devices of a particular VLAN. For Layer 3, the packet arrives at the external lookup device 309, and the source IP address is looked up in the Layer 3 table. The external lookup device 309 looks up and indexes the destination IP address in a next-hop table, which lists the outgoing interface of the network device 300 and the destination MAC address. The outgoing interface provides an index in the Layer 3 interface table that supplies the source MAC address and the VLAN. Other lookup operations, such as access control list (ACL) and network address translation (NAT) are also performed at this level. (The packet rewrite device 350 later uses this information to rewrite the packet after the packet has been parsed.) The operations of the forwarding device 342 can be performed in the hardware of the control device 302 without placing undue load on the CPU 320.

The forwarding device 342 passes the packet to the admission control device 344. The queuing, replication and Data Center Transmission Control Protocol (DCTCP) processes occur at the admission control device 344. Depending on the amount of shared buffer space available, the control device 302 stores the packet in a reserved per-port location, the reserved per-queue location, or the dynamic shared space. All these spaces are part of a shared buffer. Then the control device 302 sends the packets to a queue for scheduling. The control device 302 makes a decision for packet replication at the output buffer 346. The replication occurs at the egress process device 348, as the control device 302 places the packets in queues for scheduling. The replication process does not replicate the packet. Instead, the control device 302 manages the packet by using a pointer in memory. During the packet rewrite process, the control device 302 generates a different header on each outgoing interface. A result is similar latency times across all the outgoing interfaces that are sending the same data.

The control device 302 can receive traffic that the network device 300 is not configured to handle. In response, the control device 302 can resolve the uncertainty internally, and/or can communicate with another network device, which assist the network device 300 in resolving the uncertainty. For example, the other network device 300 can identify the required protocol and send the protocol to the network device 300. Steps for resolving such uncertainty are further discussed below with reference to FIGS. 4 & 5.

Methods Overview

Embodiments discussed below include two specific approaches for configuring a network device (e.g., router and/or switch) when the network device receives a packet having unknown and/or unrecognizable parameters of a known protocol. A first approach is described below with reference to FIG. 4, where the network device resolves a protocol internally via some internal lookup. A second approach is described below with reference to FIG. 5, where a network device resolves a protocol by sending a request for help to one or more other network devices. In both approaches, if the protocol can be resolved (e.g., either internally or with the help of other network devices), then the network device automatically reconfigures itself. Such reconfiguration does at least two things: (1) resolves the local problem of the network device, and (2) helps ensure consistency across all network devices that are part of the common framework.

Figure 4:
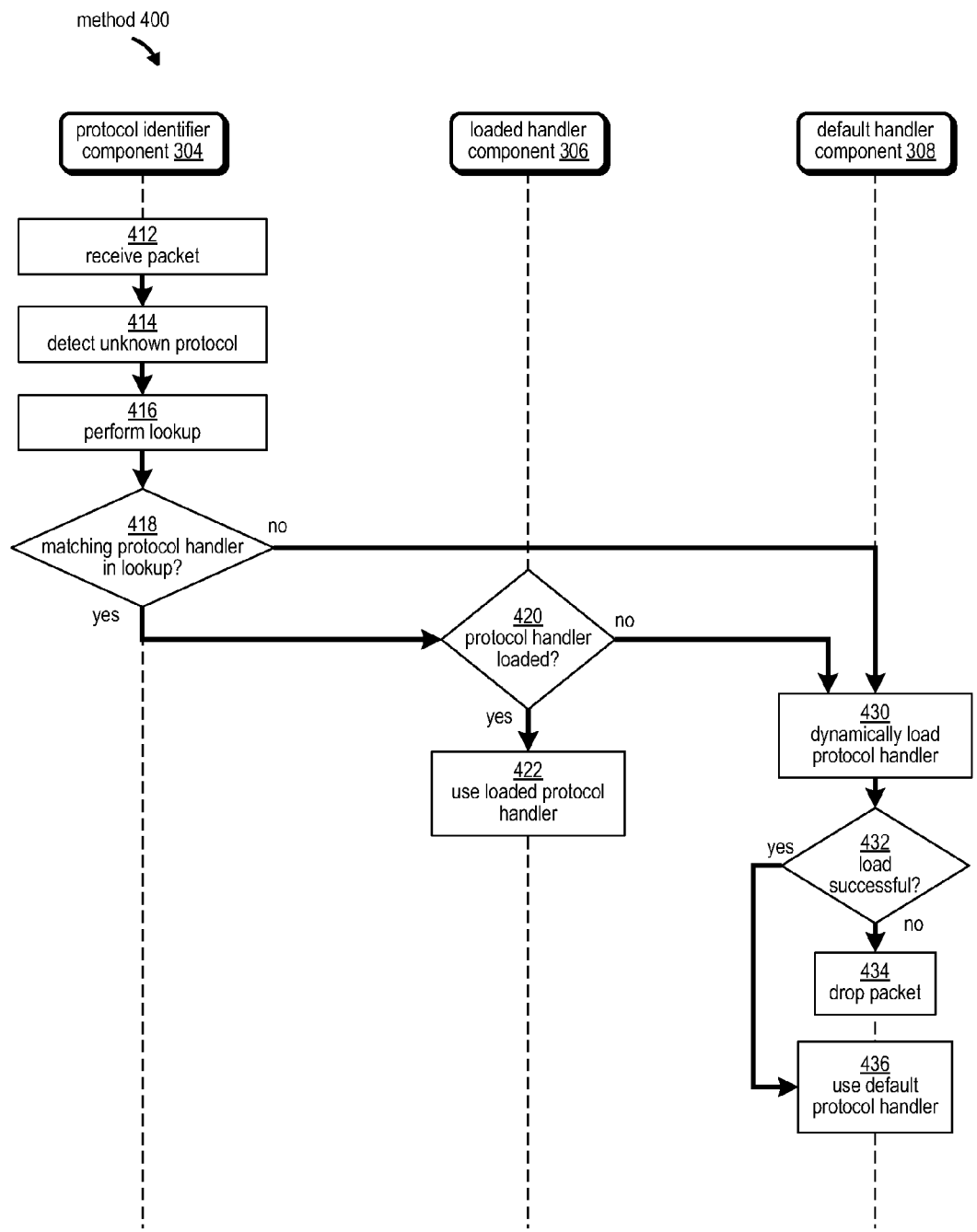
FIG. 4 is a flowchart of an example method for providing a common framework for network devices (e.g., switches, routers, etc.), according to certain embodiments of the present disclosure.

FIG. 4 illustrates a method 400 for providing a common framework for network devices (e.g., switches, routers, etc.), according to one embodiment. In some implementations, the method 400 may be performed by the network device 300 of FIG. 3, which includes a forwarding device 342 having a protocol identifier component 304, a loaded handler component 306, and a default handler component 308. The method 400 of FIG. 4 allows a network device 300 of FIG. 3 to learn an otherwise unknown protocol, or how to process an otherwise unrecognized traffic flow or packet received at that network device. Likewise, other network devices of the data center can also carry out the method 400 of FIG. 4. The learning operations among the network devices enable the network devices to operate within a common agent framework on the data center.

At step 412, the protocol identifier component 304 receives a packet parsed by X. For example, the protocol identifier receives a parsed packet from a parser device of the network device. The parser device extracts fields used decide what to do with the packet or where to forward the packet. The parser device may extract a header that identifies a protocol defining how the network device should handle the packet.

At step 414, the protocol identifier component 304 determines that the protocol headers of the packet received at step 412 identify a protocol unknown to an input interface of the network device. For example, the protocol identifier component may use an existing hierarchical classification system, with appropriate extensions, to detect an identification of a protocol.

At step 416, each time an unknown protocol is identified in the parsed packet, the protocol identifier component 304 performs a lookup to determine if a matching protocol handler is available for the network device. In one embodiment, the network device can also read Multiprotocol Label Switching (MPLS) tags, read Virtual Extensible Local Area Network (VxLAN) identifiers, and perform Deep Packet Inspection (DPI), among other operations. While most lookups are likely to occur locally on the network device, the lookup can also occur off-switch externally from the network device.

At step 418 and 420, if the protocol identifier component 304 determines the unknown protocol matches a protocol handler in memory and the loaded handler component 306 determines the required protocol is loaded (e.g., loaded into RAM 324 of FIG. 3), then the method 400 moves to a step 422 where the network device uses the newly loaded protocol handler to perform operations on the packet. For example, the network device passes the packet, the pointer to the packet, and/or the packet flow to the appropriate protocol-specific handler.

Otherwise, if the protocol identifier component 304 determines the unknown protocol does not match a protocol handler in memory and/or the loaded handler component 306 determines the required protocol is not loaded (e.g., not loaded into RAM 324 of FIG. 3), then the network device passes packet (and/or a pointer to the packet) to the default handler component 308. Accordingly, the default handler component 308 acts somewhat like a default route for a routing table, except the default handler deals with packet flow control, not just next-hop routing.

At step 430, the default handler component 308 dynamically loads the appropriate protocol handler on the network device (e.g., RAM 324 of FIG. 3) and registers any applicable routes in a component of the network device that performs routing operations and/or switching operations. In some implementations, the default handler component 308 uses an application programming interface (API) on the network device to dynamically load and/or register the appropriate protocol handler on the network device. The API of the network device is a feature of the single platform kit 202 of FIG. 2. The loading is dynamic because the default handler component 308 loads the appropriate protocol handler into memory after the network device receives the packet and during processing operations for the packet. In the method 400 of FIG. 4, the default handler component 308 registers the protocol-specific handler as the appropriate protocol handler for all packet flows that match particular criteria at an input filter (e.g., input interface) of the network device. In order to do this, the default handler component 308 may need to go through further classification of the packet or flow.

At step 432, if the default handler component 308 determines the dynamic load is successful, then at step 436 the network device uses the default protocol handler to perform operations on the packet. However, if the default handler component 308 determines the dynamic load is unsuccessful, then at step 434 the network device drops the packet. For example, the API of the network device may not provide access to an appropriate protocol handler for the particular packet. Further, the network device can communicate with other network devices to provide an opportunity for the other network devices to load the protocol handler corresponding to the matching protocol into memory of the other network devices.

Figure 5:
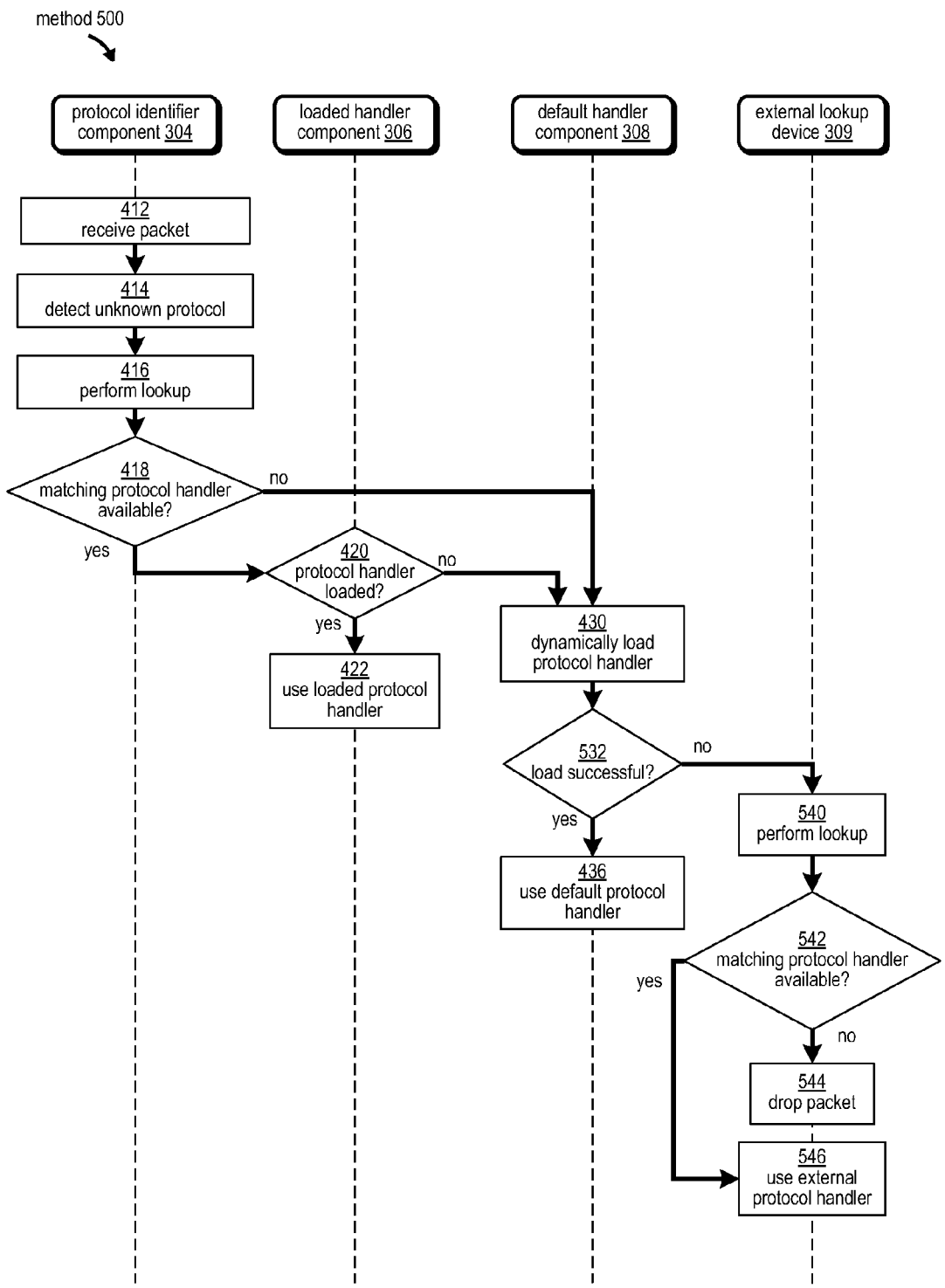
FIG. 5 is a flowchart of another example method for providing a common framework for a network device, according to certain embodiments of the present disclosure.

FIG. 5 illustrates another method 500 for providing a common framework for a network device, according to certain embodiments of the present disclosure. Method 500 is similar to the method 400, except the network device utilizes an external lookup device 309 in the method 500. In particular, methods 400 and 500 are similar for steps 412-430, which are described above with reference to FIG. 4.

At step 532, if the default handler component 308 determines that the default protocol handler is loaded successfully, then the network device uses the default protocol handler to perform operations on the packet in step 436. However, if the default handler component 308 determines the default protocol handler is not loaded successfully, then the default handler component 308 passes the packet and/or a pointer to the packet to the external lookup device 309. Alternatively, network device can pass the packet and/or a pointer to the packet immediately after step 418 where the protocol identifier 304 determines there is no matching protocol handler in the local lookup. Alternatively, the network device can entirely bypass performing an internal lookup and can immediately send the packet and/or a pointer to the packet to the external lookup device 309 upon detecting an unknown protocol in the step 414.

At step 540, the external lookup device 309 performs a lookup to determine if a matching protocol handler is available at the external lookup device 309. At step 542, if the external lookup device determines a matching protocol handler is available, then the method 500 moves to a step 546 where the network device uses the protocol handler that the external lookup device 309 makes available to the network device. However, if the external lookup device 309 determines a matching protocol handler is unavailable, then the method 500 moves to a step 544 where the network device drops the packet.

These methods may include other steps and/or details that are not discussed in this method overview. Other steps and/or details described herein may be a part of the methods, depending on the implementation. Persons skilled in the art will understand that any system configured to implement the method steps, in any order, falls within the scope of the present invention.

Alternative Embodiments

Embodiments discussed above allow a network device to respond to unknown frames, packets, or flows, by learning new protocols, configuring additional protocol handlers, etc. A hierarchy or classification is important for "asymmetric" packet flows (e.g., packet flows in which different packets go through different devices, for reasons such as load balancing or asymmetric routing, where packets flow through different routes in different directions). An external lookup service (e.g., external lookup device 309) using the single platform kit 202 of FIG. 2 can be configured monitor flows across multiple switches.

The location of the default handler component 308 can vary. In the single platform kit 202 of FIG. 2, the default protocol handler can include an application configured to run on the network device, on a blade server that is accessible to the network device, or on a separate network device.

In some implementations, like using default routes for a packet, the default handler component 308 can include a chain of default handlers, such that each default handler in the chain can potentially provide the appropriate protocol handler for a particular packet. For example, the network device can use a first default handler, which attempts to perform an appropriate protocol classification and to load the appropriate protocol handlers. In one implementation, the first attempted classification happens locally, and then subsequent attempted classification involves accessing new handlers from another network device. The network device passes the packet and/or packet flow to the next potential default handler only if the network device is unsuccessful at loading an appropriate protocol handler by using the first default handler, and so on. This hierarchical approach enables asymmetric flows to be handled by a device (e.g., a device including an application running on a network device) that is registered as a default handler for multiple switches.

Similar to a chain of default handlers, the default handler component 308 may include nested encapsulations of default handlers. Accordingly, the network device can decode the nested encapsulations of default handlers to determine if one of the nested default handlers is the appropriate handler for the particular packet.

In some implementations, the default handler component 308 is configured to register a custom protocol from a third party and to place the custom protocol in high priority in a default handler chain. All ordinary packets and flows (e.g., lower priority packets and flows) may go through. However, the network device can identify the custom protocol and can handle the packet accordingly. Alternatively, the network device can pass the packet and/or pointer to the packet to a third-party-provided network device by using an application of the single platform kit 202 of FIG. 2.

In some implementations, the protocol handler is not loaded on the memory of the network device. For example, the control device 302 can be configured to handle certain packet flows completely within a controller application. The controller application can actively manage the routes and control the data flows, instead of just "loading" a protocol handler that resides on the network device.

In some implementations, a network device can dynamically load and/or unload a protocol handler into memory (e.g., RAM 324 of FIG. 3). The network device can start with only very basic protocols loaded, and then dynamically load a new protocol as a new protocol is encountered. Similarly, the network device can unload a protocol that the network device has not used for a period of time. Further, the network device can upgrade protocol versions. For example, if a protocol version goes from a version 2.0 to a version 3.0, then the network device can automatically install the version 3.0 of the protocol handler.

In some implementations, a network device is configured to instantiate an appropriate protocol handler dynamically. Instantiation is the generation of a real instance or particular realization of an abstraction or template such as a class of objects or a computer process. To instantiate is to generate such an instance by, for example, defining one particular variation of an object within a class, giving the variation a name (e.g., naming a protocol handler), and locating the variation in some physical space (e.g., loading a protocol handler in memory of a network device). Particularly for applications that are handled off the network device, the protocol handler can be located on a virtual machine that is dynamically instantiated when a packet or flow is detected. A third party can even control such a virtual machine.

The common framework can automatically instruct a network device to load more than protocol handlers on memory of the network device. For example, the common framework can automatically instruct the network device to automatically load and/or unload routes and/or policies as well. For instance, a protocol handler that is configured to handle Session Initiation Protocol (SIP) setup packets can load a Real-time Transport Protocol (RTP) handler and a Quality of Service (QoS) policy onto the network device and associate the network device with the expected RTP flow. The network device can unload the QoS policy when the RTP handler is unloaded.

One implementation of the present technology enables the dynamic loading of an OpenFlow controller in response to OpenFlow control packets. OpenFlow is a Layer 2 communications protocol that gives access to the forwarding plane of a network switch or router over the network. In simpler terms, OpenFlow enables a path of network packets through a network of switches to be determined by software running on multiple routers (minimum two routers, primary and secondary). Separating the control plane from the forwarding plane allows more sophisticated traffic management than is feasible using access control lists (ACLs) and routing protocols. OpenFlow enables software-defined networking (SDN). The OpenFlow controller does not need to be on the network device itself (e.g., not on the switch). Rather, the OpenFlow controller can be located on a blade server of a switch, allowing legacy switches to support OpenFlow without any upgrade to the operating system (e.g., the Internetwork Operating System (IOS) available from Cisco Systems, Inc.)

In some implementations, a first network device can identify a packet's path/flow through the network. The first network device (or a network management console) can communicate with other network devices along the packet's path/flow and provide an opportunity for the other network devices to load the protocol that that first network device loaded. Alternatively, in a broader scope, the first network device (or a network management console) can communicate with substantially all network devices in the network (not just network devices in the packet's path/flow) and provide an opportunity for substantially all network devices to load the protocol. Accordingly, lookups and, thus, latency can be minimized on a grand scale throughout the network.

Advantageously, the present technology provides a mechanism for flexible on-demand push of protocol information. If a new protocol is noted on the network, the network device (e.g., switch, router, etc.) can look up the type of packet and can use the single platform kit to dynamically load drivers and control logic for that protocol onto the network device. The approach is similar to how a personal computer (PC) loads a device driver on demand. Alternatively, an off-switch device (e.g., a virtual machine) can instantiate the protocol handler.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

What is claimed is:

1. A computer-implemented method for automating packet handling on a network device, the method comprising:
    receiving a packet;
    detecting the packet is associated with a protocol that is unknown to an interface of the network device;
    performing a lookup of the protocol to identify a matching protocol for the unknown protocol; and
    upon determining a matching protocol is available, dynamically loading a protocol handler corresponding to the matching protocol into memory of the network device, wherein the protocol handler is loaded into the memory after the network device receives the packet and during processing operations for the packet.

2. The method of claim 1, further comprising, communicating with one or more other network devices to provide an opportunity for the one or more other network devices to load the protocol handler corresponding to the matching protocol into memory of the one or more other network devices.

3. The method of claim 1, further comprising:
    determining that a matching protocol handler is available at the network device; and
    determining that the matching protocol handler is not loaded on the network device.

4. The method of claim 1, further comprising, parsing the packet to extract fields used to handle the packet, wherein an extracted field includes a header that identifies a protocol for handling the packet.

5. The method of claim 1, wherein performing the lookup comprises at least one of:
    reading Multiprotocol Label Switching (MPLS) tags;
    reading Virtual Extensible Local Area Network (VxLAN) identifiers;
    performing Deep Packet Inspection (DPI); or
    performing pattern matching on the packet header.

6. The method of claim 1, wherein performing the lookup comprises sending the packet to an external lookup device to perform a lookup for the protocol handler for the packet.

7. The method of claim 1, further comprising, passing to the protocol handler at least one of:
    the packet;
    a pointer to the packet; or
    a packet flow.

8. The method of claim 1, further comprising dynamically registering one or more applicable routes in a component of the network device that is configured to perform packet switching operations.

9. The method of claim 1, further comprising registering the protocol handler in memory for use on other data packets that match particular criteria of the network device.

10. The method of claim 1, wherein dynamically loading the appropriate protocol handler comprises using an application programming interface (API) of a single platform kit, wherein the single platform kit includes a toolkit for development, automation, and rapid service generation on a data center to which the network device is connected.

11. A network device configured for automating packet handling on a network device, the network device comprising:
    a protocol identifier component configured to receive a packet, detect the packet is associated with a protocol that is unknown to an interface of the network device, perform a lookup of the protocol that is unknown in order to determine if a matching protocol is available for the network device; and
    a default handler component configured to dynamically load an appropriate protocol handler into a memory of the network device, wherein the appropriate protocol handler is loaded into the memory after the network device receives the packet and during processing operations for the packet.

12. The network device of claim 11, further comprising a loaded handler component configured to determine if a matching protocol handler is not loaded on the network device.

13. The network device of claim 12, wherein the default handler component includes a chain of default handlers such that each default handler in the chain of default handlers can potentially provide the appropriate protocol handler for a particular packet.

14. The network device of claim 13, wherein the default handler component is configured to register a custom protocol from a third party and to place the custom protocol in high priority in the chain of default handlers.

15. One or more non-transitory computer-readable storage media storing instructions for automating packet handling on a network device, wherein the instructions, when executed, direct the one or more processors to perform steps comprising:
    receiving a packet;
    detecting the packet is associated with a protocol that is unknown to an interface of the network device;
    determining if a matching protocol is available for the network device; and
    dynamically loading an appropriate protocol handler into a memory of the network device, wherein the appropriate protocol handler is loaded into the memory after the network device receives the packet and during processing operations for the packet.

16. The network device of claim 12, wherein the appropriate protocol handler is located on a virtual machine that is dynamically instantiated after the packet is detected.

17. The network device of claim 12, wherein the network device is linked to a softwared defined network.

18. The network device of claim 12, wherein the network device is configured to communicate with one or more other network devices to provide an opportunity for the one or more other network devices to load the appropriate protocol handler into memory of the one or more other network devices.

19. The network device of claim 12, wherein the default protocol handler comprises an application configured to run on at least one of:
    the network device;
    a blade server that is accessible to the network device; or
    another network device that is completely separate from the network device.

\* \* \* \* \*